United States Patent [19]

Binns

[11] Patent Number: 5,452,974
[45] Date of Patent: Sep. 26, 1995

[54] DEFORMABLE LOCKING FASTENER SYSTEM AND METHOD OF USE

[75] Inventor: Lloyd Binns, Harbor City, Calif.

[73] Assignee: Air Industries Corporation, Garden Grove, Calif.

[21] Appl. No.: 26,345

[22] Filed: Mar. 4, 1993

[51] Int. Cl.$^6$ ............................ F16B 31/00; F16B 33/04; F16B 39/02
[52] U.S. Cl. ............................ 411/3; 411/336; 411/937.2
[58] Field of Search ..................... 411/2–5, 310, 411/311, 418, 420, 421, 336, 937.2

[56] References Cited

U.S. PATENT DOCUMENTS

| Re. 28,907 | 7/1976 | Eibes et al. . |
|---|---|---|
| 445,166 | 1/1891 | Elliott . |
| 495,520 | 4/1893 | Sayre . |
| 930,450 | 8/1909 | Zinow . |
| 996,962 | 7/1911 | Baling . |
| 1,172,427 | 2/1916 | Carlson . |
| 1,389,927 | 9/1921 | Ball . |
| 1,603,618 | 10/1926 | McClellan . |
| 1,892,119 | 12/1932 | Thompson . |
| 1,966,835 | 1/1933 | Stites . |
| 2,202,240 | 5/1940 | Trotter . |
| 2,349,591 | 5/1944 | Hosking . |
| 2,349,592 | 5/1944 | Hosking . |
| 2,349,593 | 5/1944 | Hosking . |
| 2,370,352 | 2/1945 | Hosking . |

(List continued on next page.)

FOREIGN PATENT DOCUMENTS

| 222771 | 7/1959 | Australia . |
|---|---|---|
| 659650 | 3/1963 | Canada . |
| 0273079 | 6/1988 | European Pat. Off. . |
| 1199636 | 12/1959 | France . |
| 1228099 | 3/1960 | France . |
| 2301723 | 9/1976 | France . |
| 914082 | 7/1954 | Germany . |
| 516493 | 8/1963 | Germany . |
| 669037 | 12/1965 | Germany . |
| 6602955 | 6/1968 | Germany . |
| 1675031 | 12/1970 | Germany . |
| 1750585 | 2/1971 | Germany . |
| 2208044 | 8/1973 | Germany . |
| 2355189 | 5/1974 | Germany . |
| 2411449 | 11/1974 | Germany . |
| 2350679 | 10/1975 | Germany . |
| 33-2507 | 2/1958 | Japan . |
| 40-23684 | 8/1965 | Japan . |
| 42-20950 | 10/1967 | Japan . |
| 45-27153 | 10/1970 | Japan . |
| 47-12818 | 6/1972 | Japan . |
| 47-29744 | 11/1972 | Japan . |
| 47-35454 | 11/1972 | Japan . |
| 48-36254 | 5/1973 | Japan . |
| 48-44658 | 6/1973 | Japan . |
| 48-50153 | 7/1973 | Japan . |
| 48-97557 | 11/1973 | Japan . |
| 48-96358 | 11/1973 | Japan . |

(List continued on next page.)

Primary Examiner—Neill R. Wilson
Attorney, Agent, or Firm—Knobbe, Martens, Olson & Bear

[57] ABSTRACT

An improved deformable locking fastener system comprises a fastener, a deformable collar and a dedicated installation tool. The fastener has a threaded exterior defining a plurality of axial flutes which are configured to prevent of the collar from prematurely captivating the fastener during installation. The collar comprises a cylindrical forward portion, a central portion having an elliptical cross-sectional shape and a rearward portion having an elliptical cross-sectional shape. The collar portions have axial heights selected to maximize the strength of the collar and to minimize the weight of the collar. The installation tool contacts the collar along driving ridges which reduces the radial compression of the collar and increases the tangential driving force turning the collar during installation. In addition, the installation tool includes oblique driving ridges and exit vents which prevent premature cam-off of the installation tool when generating a desired preload and swaging the collar onto the fastener to lock the components together.

7 Claims, 10 Drawing Sheets

U.S. PATENT DOCUMENTS

| | | |
|---|---|---|
| 2,396,661 | 7/1945 | Keller et al. |
| 2,546,332 | 3/1951 | Costello |
| 2,596,885 | 5/1952 | Booth |
| 2,796,107 | 6/1957 | Schwaiger |
| 2,815,787 | 10/1957 | Podell |
| 2,897,867 | 8/1959 | Torre |
| 2,923,339 | 2/1960 | Skidmore |
| 2,940,495 | 6/1960 | Wing |
| 2,955,505 | 10/1960 | Schuster |
| 3,034,611 | 5/1962 | Zenzic |
| 3,139,786 | 7/1964 | Ardell |
| 3,218,656 | 11/1965 | Reiland |
| 3,311,147 | 3/1967 | Walker |
| 3,340,920 | 9/1967 | Johnson |
| 3,390,906 | 7/1968 | Wing |
| 3,418,012 | 12/1968 | La Torre |
| 3,421,562 | 1/1969 | Orloff et al. |
| 3,433,280 | 3/1969 | Reusser |
| 3,434,379 | 3/1969 | Wing |
| 3,449,998 | 6/1969 | Wing |
| 3,464,306 | 9/1969 | Reynolds et al. |
| 3,492,908 | 2/1970 | Thurston |
| 3,534,651 | 10/1970 | Belfigilo |
| 3,578,367 | 5/1971 | Harvill et al. |
| 3,603,132 | 9/1971 | Holmes |
| 3,621,502 | 11/1971 | Velthoven |
| 3,683,989 | 8/1972 | Follstaedt et al. |
| 3,687,501 | 8/1972 | Wilson et al. |
| 3,698,278 | 10/1972 | Trembley |
| 3,746,067 | 7/1973 | Gulistan |
| 3,750,732 | 8/1973 | Moebius |
| 3,763,725 | 10/1973 | Reiland |
| 3,789,726 | 2/1974 | Gill et al. |
| 3,792,933 | 2/1974 | Stencel |
| 3,854,372 | 12/1974 | Gutshall |
| 3,865,007 | 2/1975 | Stanback |
| 3,920,338 | 11/1975 | Dahl |
| 3,930,428 | 1/1976 | Hale |
| 4,005,740 | 2/1977 | Villo et al. |
| 4,007,540 | 2/1977 | Tyree |
| 4,061,367 | 12/1977 | Moebius |
| 4,074,011 | 2/1978 | Teramae et al. |
| 4,088,053 | 5/1978 | Tyree |
| 4,176,582 | 12/1979 | Witte |
| 4,260,005 | 4/1981 | Stencel |
| 4,291,737 | 9/1981 | McMurray et al. |
| 4,326,825 | 4/1982 | Volkmann et al. |
| 4,383,353 | 5/1983 | Stencel |
| 4,408,936 | 10/1983 | Williamson |
| 4,472,096 | 9/1984 | Ruhl et al. |
| 4,485,510 | 12/1984 | Hatter |
| 4,544,312 | 10/1985 | Stencel |
| 4,601,623 | 7/1986 | Wallace |
| 4,682,520 | 7/1987 | Gray |
| 4,735,537 | 5/1988 | Rath |
| 4,742,735 | 5/1988 | Stencel |
| 4,768,910 | 9/1988 | Rath |
| 4,806,054 | 2/1989 | Rath |
| 4,815,907 | 3/1989 | Williamson et al. |
| 4,842,466 | 6/1989 | Wheeler et al. |
| 4,877,363 | 10/1989 | Williamson et al. |
| 4,957,401 | 9/1990 | Hatter |
| 4,983,084 | 1/1991 | Gray |
| 4,983,085 | 1/1991 | Gray |
| 5,145,300 | 9/1992 | Wallace |
| 5,148,727 | 9/1992 | Williamson |

FOREIGN PATENT DOCUMENTS

| | | |
|---|---|---|
| 48-82260 | 11/1973 | Japan |
| 49-1941 | 1/1974 | Japan |
| 49-19164 | 2/1974 | Japan |
| 49-65877 | 6/1974 | Japan |
| 49-82852 | 8/1974 | Japan |
| 49-91656 | 8/1974 | Japan |
| 49-93761 | 9/1974 | Japan |
| 50-77655 | 7/1975 | Japan |
| 50-84663 | 7/1975 | Japan |
| 50-137466 | 11/1975 | Japan |
| 50-146761 | 11/1975 | Japan |
| 50-157759 | 12/1975 | Japan |
| 50-153162 | 12/1975 | Japan |
| 51-34959 | 3/1976 | Japan |
| 51-51654 | 5/1976 | Japan |
| 51-83957 | 7/1976 | Japan |
| 51-97661 | 8/1976 | Japan |
| 51-148564 | 11/1976 | Japan |
| 51-136068 | 11/1976 | Japan |
| 51-139867 | 11/1976 | Japan |
| 51-151859 | 12/1976 | Japan |
| 52-30555 | 3/1977 | Japan |
| 52-58377 | 4/1977 | Japan |
| 52-62757 | 5/1977 | Japan |
| 52-131564 | 10/1977 | Japan |
| 61-36510 | 2/1986 | Japan |
| 34118 | 1/1913 | Sweden |
| 895237 | 5/1962 | United Kingdom |
| 922333 | 3/1963 | United Kingdom |
| 959137 | 5/1964 | United Kingdom |
| 985714 | 3/1965 | United Kingdom |
| 1049239 | 11/1966 | United Kingdom |
| 1087446 | 10/1967 | United Kingdom |
| 1146241 | 3/1969 | United Kingdom |
| 1161884 | 8/1969 | United Kingdom |
| 1233238 | 5/1971 | United Kingdom |
| 1238374 | 7/1971 | United Kingdom |
| 1272818 | 5/1972 | United Kingdom |
| 1376851 | 12/1974 | United Kingdom |
| 1391228 | 4/1975 | United Kingdom |
| 1418282 | 12/1975 | United Kingdom |
| 1448595 | 9/1976 | United Kingdom |

DEFORMABLE LOCKING FASTENER SYSTEM AND METHOD OF USE

BACKGROUND OF THE INVENTION

1. Field of the Invention

The present invention relates to fastener systems and, in particular, to locking fastener systems.

2. Description of Related Art

Various locking fastener systems have been developed to join together materials under a desired compressive force and to "lock" in place to prevent unintentional loosening primarily due to vibrational forces. Prior fastener systems commonly include a collar (i.e., a nut) which fastens to a fastener (i.e., a bolt or a pin) to produce a predetermined preload between the fastener and the collar. That is, a tension force develops between the fastener and the collar as the collar is threaded onto the fastener, placing the intervening joint in compression. The collar subsequently locks onto the fastener by a variety of means.

Some prior locking fastener systems rely on swaging the collar onto the fastener to lock the components together. Examples of locking fastener systems which swag collar material into the fastener are disclosed in U.S. Pat. No. 4,383,353, issued to Stencel; U.S. Pat. No. 4,601,623, issued to Wallace; and U.S. Pat. No. 5,145,300, issued to Wallace.

These prior fastener systems, however, suffer from several drawbacks. Prior fastener systems which first generate a preload and subsequently swage collar material into the fastener tend to produce scattered preload values. That is, the designed preload value produced by a particular size of fastener could widely ranged between a minimum value and a maximum value. For instance, a ¼"-28 UNF titanium fastener system, of the type disclosed in application Ser. No. 07/481,373, typically produces preload values ranging between 1500 lbs. and 3000 lbs. Consequently, industry commonly used larger fastener systems to ensure a minimum preload value; however, larger fastener systems increase the weight of the assembly, which the aeronautical and aerospace industries particularly disfavor.

Additionally, prior installation tools used with these locking fastener systems further exacerbate the scattering of preload values. Prior installation tools tend to prematurely disengage from the collar (i.e., "cam-off"). That is, the forward end of the collar resists being deformed and forces the installation tool away from the collar. The resultant force, in combination with the continued rotation of installation tool, winds the installation tool off of the collar prior to completely producing the desired preload, thereby frustrating the installation process and generating less compression in the intervening joint than desired.

Scattered preload values also result from a technician's efforts to keep the installation tool on the collar (i.e., to compensate for the cam-off tendency) by applying end pressure to the installation tool which varies from one installation to another. And, although the massive end pressure exerted by the technician may prevent the installation tool from camming off, a corresponding exertion of equal effort may be required to extract the installation tool after installation, further frustrating the installation process.

Moreover, prior installation tools require about 360° of tool rotation about the collar, once the desired preload has been produced, in order to swage the collar onto the fastener. In confined working quarters, this degree of tool rotation is difficult, even using a ratcheting wrench.

Finally, prior installation tools and fastener systems tend to over-strain a flimsy hexagon key which engages a cooperative recess in the tail of the fastener and carries the reaction force during blind side installation. The hexagon key commonly breaks under excessive force or the fastener tail recess commonly erodes. Over straining results when the swaging operation commences while the collar is still capable of rotating under the applied torque.

SUMMARY OF THE INVENTION

The present invention includes a fastener system comprising a duplex collar, a fastener and an installation tool used to install the collar onto the fastener. The collar comprises a cylindrical forward portion, a central portion having an elliptical cross-sectional shape and a rearward portion having an elliptical cross-sectional shape. The installation tool includes cavities having shapes complementary to the shape of the duplex collar and fits over the collar during the installation process. Rotation of the installation tool applies a torque to the collar and threads the collar onto the fastener.

The present invention further includes the recognition that by engaging and torquing the collar with smooth, arcuate or flat surfaces of the installation tool produces a rotational force having a greater compressive force vector than a tangential force vector. Consequently, the applied torque elastically deforms (i.e., crushes) the collar inwardly into the threads of the fastener which increases the friction between the fastener and the collar. The increased friction typically causes the fastener to rotate with the collar, thereby over-stressing and breaking the hexagon key used to restrain the fastener in blind side fastening.

In addition, the elastic deformation of the collar typically produces artificial preload values which decrease after removing the installation tool from the collar. The increase in friction between the fastener and the collar requires more torque to install the fastener. However, when the installation tool is removed, the collar material springs back to its pre-deformed configuration and the preload value decreases.

The installation tool of the present invention minimizes the contact surface between the installation tool and the collar by applying a tangential force to the collar along driving ridges. The force applied along the driving ridges produces a significantly greater tangential force vector component than a radial force vector component, thus applying a greater driving force and a lesser crushing force than that applied by prior installation tools. Consequently, the present fastener system enhances the repeatability of preload values over the repeatability achieved by prior fastener systems. Additionally, less torque is applied to the fastener during installation, thus reducing the torque applied to the hexagon key.

The driving ridges are advantageously spaced apart from each other by a distance substantially equal to a diametric distance between camming surface of the collar. As a result, rotation of the installation tool produces the desired preload valve without a massive amount of torque and without over-stressing the threads of the collar and the fastener.

The concentration of the applied tangential force (i.e., the applied torque) along a ridge requires that the force be spread over a sufficient axial length to ensure that the collar does not deform prior to applying the torque required to produce the desired preload value. However, weight considerations limit the axial length of the collar. For use in the aeronautical and aerospace industries, the collar is desirably designed to be as lightweight as possible and still produce the desired amount of compression between the joined materials (i.e., produce the desired preload).

The present collar optimizes the collar's weight and axial height, providing sufficient contact surface to disperse the applied torque such that the collar resists plastic deformation prior to applying the torque required to produce preload while having an acceptable weight. Moreover, the collar maximizes the tensile strength of the collar by maximizing the mass of the collar forward portion to improve its hoop strength. Consequently, the preload sustainable by the fastener system is increased over like-size prior fastener systems.

Through analytical and empirical analysis, it has been determined that a collar with the following axial lengths optimizes collar weight and strength: a forward portion having an axial height of 2.7 P; a central portion having an axial height of 2.9 P; and a rearward section having an axial height of 3.4 P, where P equals the pitch of the collar internal thread.

In accordance with another aspect of the present invention, the present invention includes the recognition that prior fastener flute designs also contributed to over-stressing the hexagon key used in blind side installation. Flutes, with concave shapes intersecting the fastener thread periphery at shape points, tend to prematurely capture (i.e., "precapture") the collar which encourages the fastener to rotate with the collar before reaching the required preload. That is, as the collar is tightened and the applied torque rises, prior installation tool elastically crush the collar inwardly which interferes with the sharp intersection between the flute and the fastener thread periphery. As a result, the fastener is captivated prematurely and rotates with the collar, thereby over-stressing the hexagon key and causing it to fail.

The present fastener comprises flutes having convex bottoms surfaces extending from leading shoulders which chase and blend with the fastener periphery (i.e., the crests of the fastener thread). Blending in the direction that the collar turns delays capturing the fastener, thereby allowing a higher preload to develop without over-stressing the hexagon key.

In accordance with a third aspect of the present invention, the installation tool advantageously prevents premature cam-off of the installation tool from the collar when swaging the collar. The installation tool comprises oblique driving ridges which produce an axial force thrusting the installation tool onto the collar when generating the desired preload. The installation tool additionally includes exit vent reliefs which prevent the installation tool from camming off of the collar when swaging the collar into the fastener flutes. Once the installation tool has completely swaged the collar, the installation tool freely spins off of the collar.

Additionally, the present invention also includes a preferred method of installing a deformable fastener system. The method includes the steps of engaging a first pair of driving ridges of the installation tool with the collar central portion, and engaging a second pair of driving ridges with the collar rearward portion. The installation tool is then rotated, treading the collar onto the fastener and compressing the intervening materials. Further rotation of the installation tool at a desired torque deforms a portion of the collar central portion and a portion of the collar rearward portion. Wrenching surfaces of the installation tool are then engaged with the collar rearward portion and are rotated to deform the rearward portion inwardly into the fastener flutes, thereby locking the collar to the fastener.

BRIEF DESCRIPTION OF THE DRAWINGS

These and other features of the invention will now be described with reference to the drawings of preferred embodiments, which are intended to illustrate and not to limit the invention, and in which.

DESCRIPTION OF THE PREFERRED EMBODIMENTS

Figure 1:
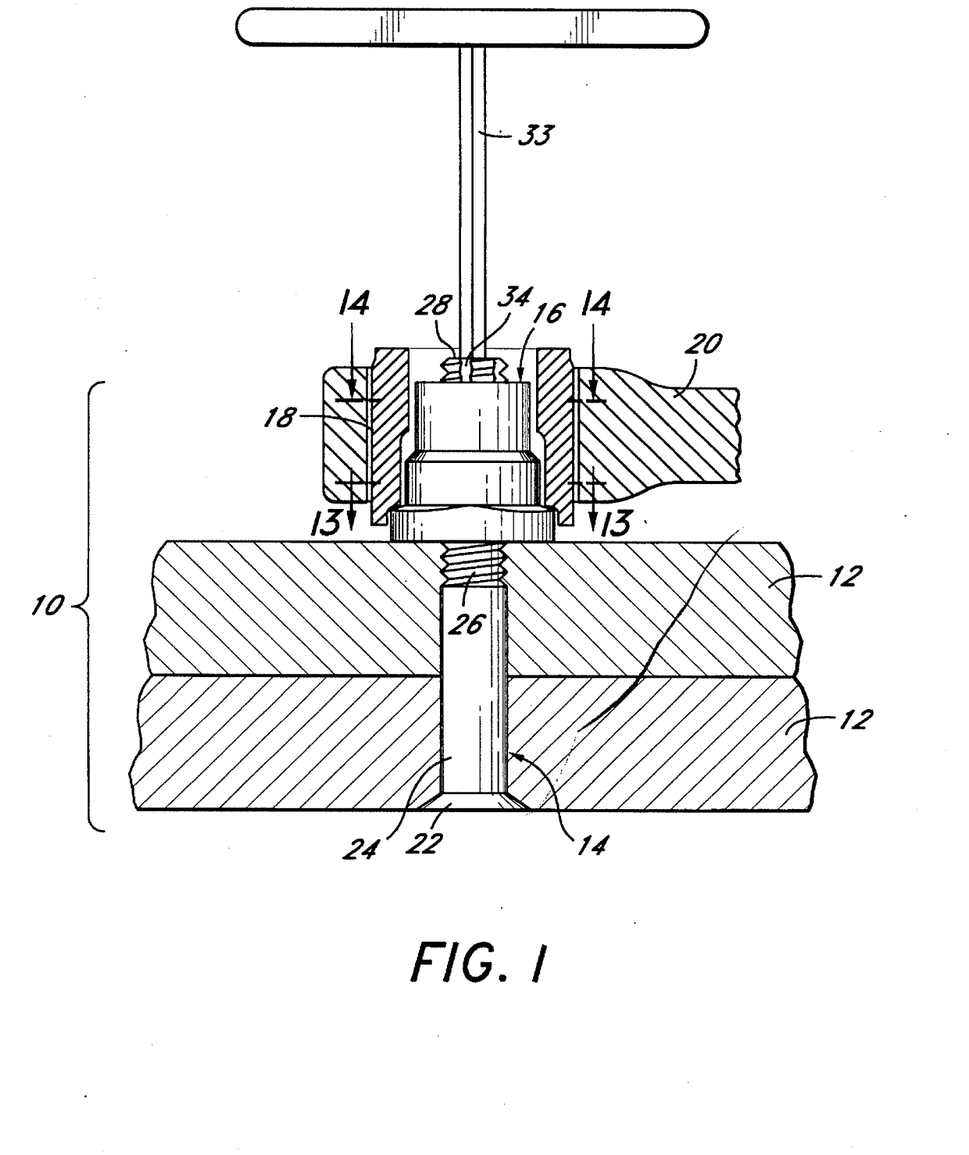
FIG. 1 is a partial cross-sectional view illustrating the locking fastener system and an installation tool of the present invention.

FIG. 1 illustrates in partial cross section a locking fastener system 10 in accordance with an embodiment of the present invention. The fastener system 10 advantageously is used to join together materials 12, to generate a desired compressive force between the joined materials 12 (i.e., "generates a preload force") and to lock in place to prevent substantial degradation of the compressive force due to vibrational forces.

The fastener system 10 comprises a threaded fastener 14, such as a bolt or a pin, and a deformable duplex collar 16 which locks onto the fastener 14 once the desired preload force has been generated. As installed in FIG. 1, the fastener 14 passes through the materials 12 from one side and the collar 16 threads onto the fastener 14 on the other side. An installation tool 18, coupled to a wrench 20, is used to rotate and to tighten the collar 16 onto the fastener 14. The individual components of the locking fastener system 10 will now be described in detail.

The Fastener

Figure 2:
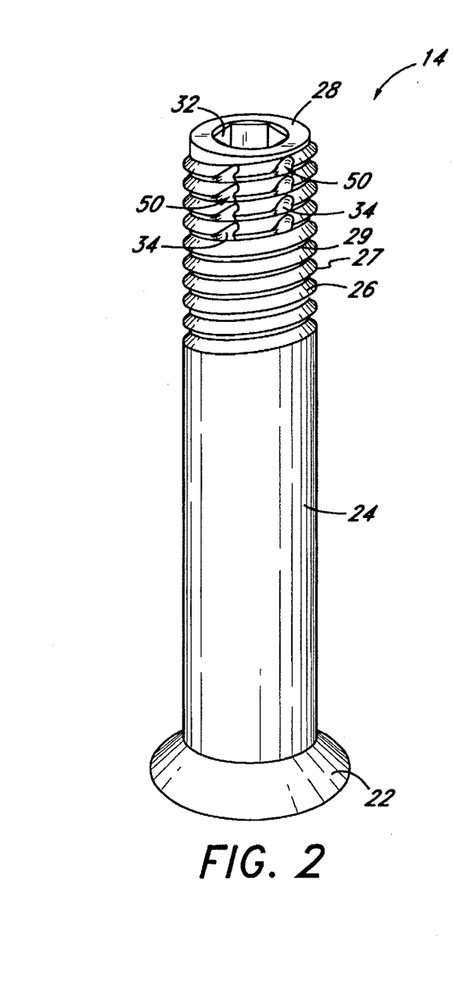
FIG. 2 is a side perspective view of a fastener of the locking fastener system of FIG. 1.
Figure 2A:
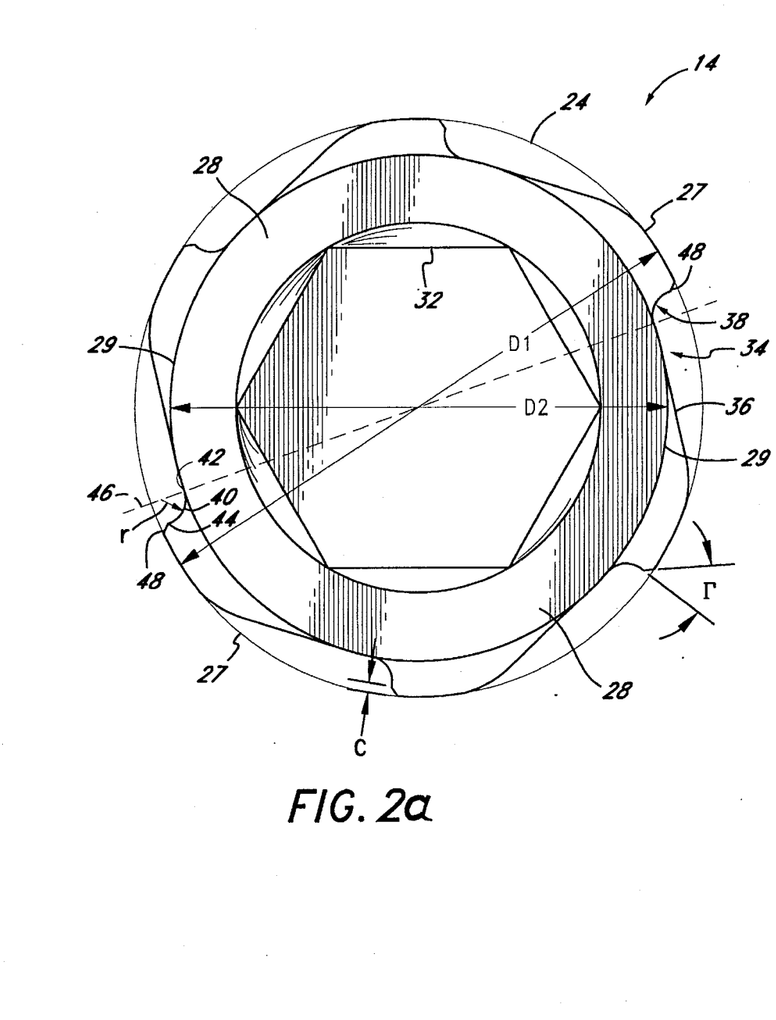
FIG. 2a is a top plan view of the fastener of FIG. 2.

As illustrated in FIG. 2, the fastener 14 comprises a head 22 and an elongated shank 24 having an externally threaded portion 26 which engages the collar 16. The threaded portion 26 comprises a standard thread forming a helical series of crests 27 and roots 29 uniformly spaced apart. As illustrated in FIG. 2a, the threaded portion 26 has a major diameter $D_1$ defined between the thread crests 27 and has a minor diameter $D_2$ defined between the thread roots 29.

The fastener 14 can have a variety of lengths and diameters according to the particular application of the fastener system 10. For instance, the fastener 14 can range in length from 0.40 to 3.0 inches and can range in diameter from 0.156 to 0.375 inch.

Referring to FIGS. 2 and 2a, a rear end 28 of the fastener 14 defines a polygonal-shaped cavity 32 extending into the fastener 14 in the longitudinal direction which receives a wrenching key 33 during installation. As used herein, "in the longitudinal direction" means in a direction parallel to the longitudinal axis of the fastener 14 (which is also generally parallel to the longitudinal axis of the collar 16). In addition, "in the radial direction" means in a direction radiating from the longitudinal axis.

The fastener threaded portion 26 defines a plurality of recesses 34 positioned proximate to the fastener end 28. Referring to FIG. 2a, each recess 34 comprises a convex bottom surface 36 extending from a shoulder 38. Although FIG. 2a illustrates the bottom surface 36 as being an arcuate convex surface, it is understood that the bottom surface 36 could comprise a plurality of straight segments connected in such a way as to allow the line defining the bottom surface 36 to chase and blend with the thread crest 27.

The shoulder 38 has an arcuate surface 40 defined by a radius r and extends between a first point 42 and a second point 44. The first point 42 is located along a diameter line 46 of the shank 24, proximate to the thread root 29. Thus, the recess 34 has a depth, measured in the radial direction from the thread crest 27 towards the fastener longitudinal axis, slightly less than the depth of the thread root 29 (i.e., slightly less than $D_1-D_2/2$).

The shoulder 38 also includes a chamfer 48 extending outwardly (i.e., away from the longitudinal axis) from the second point 44 at an angle Γ oblique to the diameter line 46. The angle Γ formed between the chamfer 48 and the diameter line 46 ranges between 15° and 45°, and desirably equals 30°. In a preferred embodiment, the length C of the chamfer 48, measured in the radial direction, equals approximately 0.0075 inch. The curved surface 40 and chamfer 48 forming the shoulder 38 generally prevent a roll-over burr from forming at the transition of the shoulder 38 and the thread crest 27 when forming the recess 34.

The convex bottom surface 36 extends from the first point 42, chasing and blending with the periphery of the thread crest 27. That is, the convex bottom surface 36 tapers radially outwardly from the first point 42 to the thread crest 27 and smoothly blends into the tread 26. Although FIGS. 2 and 2a illustrate the convex bottom surface 36 of the recess 34 as chasing and blending with the periphery of the thread crest 27 in the clockwise direction, it is understood that the convex bottom surface 36 can extend in the counter-clockwise direction, where the collar 16 threads onto the fastener 14 in the counter-clockwise direction.

As illustrated in FIG. 2, the recesses 34 form a plurality of axial flutes 50 which extend across several thread crests 27 and generally lie parallel to the longitudinal axis of the fastener 14. During the installation process, the flutes 50 receive collar material which is swaged into the flutes 50 to lock the collar 16 onto the fastener 14, as discussed infra.

Desirably, the fastener 14 includes six flutes 50 equally spaced around the circumference of the shank 24. However, the fastener 14 can include less flutes provided that the aggregate void volume defined by the flutes 50 remains substantially constant.

The Duplex Collar

Figures 3, 4, 5:
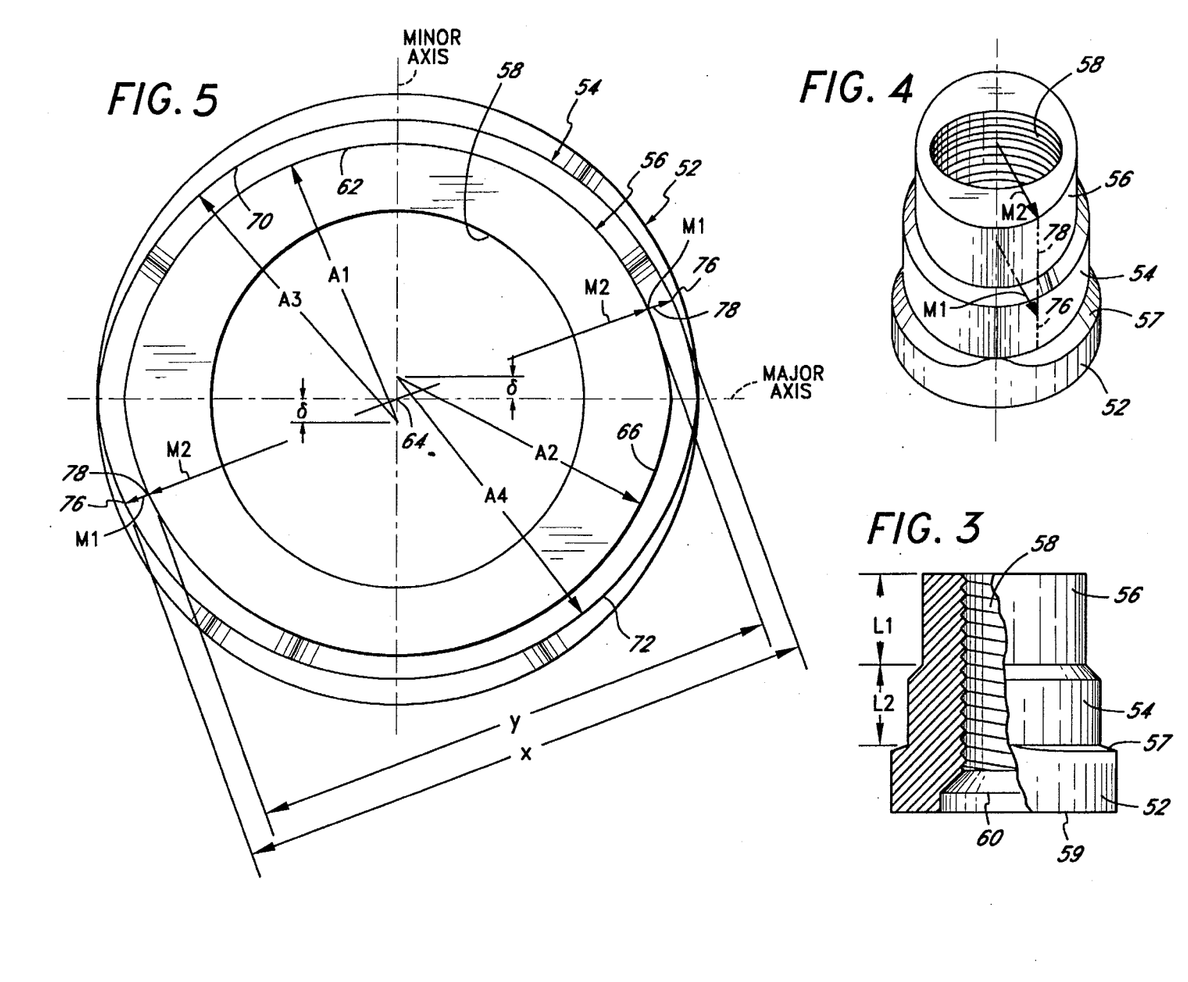
FIG. 3 is a partial cut-away side elevational view of a duplex collar of the locking fastener system of FIG. 1.
FIG. 4 is a top perspective view of the duplex collar of FIG. 3.
FIG. 5 is a top plan view of the duplex collar of FIG. 3.

Referring to FIG. 3, the duplex collar 16 has a forward base 52, a deformable central portion 54 and a deformable rearward portion 56. As used herein, "rearward" and "forward" are used to indicate the proximity of the joined materials 12 when installed. The duplex collar 16 has a stepped configuration decreasing in size from the forward base 52 to the central portion 54 to the rearward portion 56, the central portion 54 joining together the forward base 52 and rearward portion 56.

The collar 16 defines a threaded central axial bore 58 which receives the fastener threaded portion 26. The collar 16 also defines a counter-bore 60 extending into the forward base 52 from a forward end 59 of the collar 16 to ease inserting the fastener end 28 into the axial bore 58.

The forward base 52 has a cylindrical shape with a shoulder 57 tapering inwardly (i.e., towards the collar longitudinal axis), conforming to the shape of the central portion 54. The base shoulder 57 desirably is angled from the collar longitudinal axis by about 15° to provide a gripping flange for holding the collar 16 during manufacturing and to provide a registration surface for the installation tool 18, as is discussed in detail infra. This configuration of the forward base 52, in combination with the axial length of the forward base 52 specified below, maximizes the mass of the forward base 52 to improve its hoop strength. Consequently, the tensile strength of the collar 16 is substantially greater than prior duplex collar designs.

As illustrated in FIGS. 4 and 5, the central portion 54 and the rearward portion 56 have generally elliptical shapes in cross section. As used herein, "elliptical" and "ellipse" are not used in strict definitional senses, but instead are used to describe a generally smooth, continuous, out-of-round shape which deviates in shape in a cam-like fashion from a region of minimum radial dimension to a region of maximum radial dimension.

For example, FIG. 5 illustrates a top plan view of a preferred embodiment of the duplex collar 16. The rearward portion 56 is defined by two peripheral arcuate surfaces: a first peripheral surface 62 defined by a radius $A_1$ offset from a center 64 of the collar 16 by a distance δ; and a second peripheral surface 66 defined by a radius $A_2$ offset from the collar center 64 by an equal distance δ, but on the opposite side of the collar center 64 along a minor axis of the rearward portion 56. The radii $A_1$, $A_2$ have equal lengths. Likewise, the central portion 54 is defined between two peripheral arcuate surfaces. A first peripheral surface 70 is defined by a radius $A_3$ and a second peripheral surface 72 is defined by a radius $A_4$. Each radius $A_3$, $A_4$ is offset from the center 64 of the collar 16 by a distance δ, but on opposites sides of the center 64 along a minor axis of the central portion 54. The radii $A_3$, $A_4$ also have equal lengths.

The central portion 54 is sized with respect to the rearward portion 56 to produce a desired preload before locking the collar 16 onto the fastener 14. As will be explained in greater detail infra and as illustrated in FIG. 4, a moment arm $M_1$ at a camming surface 76 of the central portion 54 is selected to carry the majority of the applied torque up until a desired preload is produced. Desirably, the central portion carries about two-thirds of the torque required to produce the desired preload. A moment arm $M_2$ at a camming surface 78 of the rearward portion 56 is selected to carry the balance of the applied torque up to preload. The moment arm $M_2$ is also selected such that the rearward portion 56 plastically deforms at a torque less than the total torque required to produce the desired preload but greater than the torque carried by the rearward portion 54 up until preload. The collar rearward portion 56 plastically deforms at this intermediate torque, swaging into the flutes 50 of the fastener 14. Advantageously, the ratio of the major axis of the rearward portion 56 to the minor axis of the central portion 54 ranges from about 1.0 to about 1.2 to provide the desired moment arm lengths. In a preferred embodiment, the ratio equals 1.0.

The ratio of the minor axis to the major axis for both the central portion 54 and the rearward portion 56 ranges from about 0.83 to 0.93, and desirably equals 0.88. In other words, the eccentricity $\theta$ of the elliptical shapes for the central portion 54 and the rearward portion 56 advantageously ranges between 39.75° and 43.75°, and desirably equals about 41.75°, where the degree of eccentricity $\theta$ equals the arc-tangent of the minor diameter divided by the major diameter. If the degree of eccentricity $\theta$ of the elliptical shapes is much greater (i.e., the elliptical shape is "flatter"), too great of a moment arm exists and the applied torque will strip the threads of the collar 16 and the fastener 14. Conversely, if the degree of eccentricity of the elliptical shapes is much less (i.e., the elliptical shape is "more round"), too much torque will be required to produce the desired preload.

The axial lengths for the central portion 54 and the rearward portion 56 are also designed to generate the desired preload before plastically deforming the collar 16. That is, the axial length of the rearward portion 56 and the central portion 54 are selected to provide sufficient contact surface between the collar 16 and the installation tool 18 to disperse the applied torque such that collar 16 resists plastic deformation prior to applying the torque required to produce preload. The total axial height of the collar 16 also must be sufficient to support enough threads such that the desired preload is less than the tensile strength of the fastener system 10. Desirably, the preload value should be less than 75% of the tensile strength of the fastener system 10 for safety. However, the collar 16 should be as lightweight as possible.

In an optimal collar design, which optimizes strength and weight, the collar 16 has an axial height equal to about 9.0 P, where P equals the thread pitch of the axial bore 58. As used herein, "thread pitch" means the distance measured parallel with the collar longitudinal axis between corresponding points on adjacent thread forms in the same axial plane and on the same side of the longitudinal axis. The axial height of the forward portion 52, the central portion 54 and the rearward portion 56 desirably equal about 2.7 P, 2.9 P and 3.4 P, respectively. Therefore, as illustrated in FIG. 3, the rearward portion 56 has an axial length $L_1$ of approximately 38% of the total axial length of the collar 16. The central portion 54 has an axial length $L_2$ of approximately 32% of the total axial length of the collar 16.

Thus, for instance, a collar with a ¼-28 UNF internal thread has a total axial height of 0.321 inch. The axial heights of the forward portion 52, the central portion 54 and the rearward portion 56 equal 0.096 inch, 0.104 inch and 0.121 inch, respectively.

Referring to FIG. 5, the areas of the rearward portion 56 and of the axial bore 58 measured in a plane perpendicular to the collar longitudinal axis are selected to produce sufficient swaging of the rearward portion material to lock the collar 16 onto the fastener 14. The ratio between the total cross-sectional area of the rearward portion 56 and the area of the axial bore 58 ranges between 1.9 and 2.3, and desirably equals 2.1.

An exemplary embodiment of the collar 16 includes a ⅜-24 UNF threaded axial bore 58. The rearward portion 56 has an axial length of 0.141 inch, a major diameter of 0.440 inch and a minor diameter of 0.343 inch. The central portion 54 has an axial length of 0.121 inch, a major diameter of 0.488 inch and a minor diameter of 0.440 inch. The forward base has an axial length of 0.108 inch and a diameter equal to 0.488 inch. A fastener system 10 using a collar 16 dimensioned accordingly and made of titanium, and being installed with the installation tool 18 described below, would obtain a preload of about 4000 lbs±400 lbs. Thus, it should be understood that one skilled in the art could construct a collar 16 with the appropriate dimensions for the desired preload.

The collar 16 and fastener 14 are advantageously constructed of a lightweight, high strength metal alloy, such as, for example, an aluminum or a titanium alloy. However, it is contemplated that the collar 16 and fastener 14 could be constructed of other materials with an appropriate strength and deformability tailored to the particular application for the fastener system 10.

The collar 16 is preferably formed from a single piece of material by forging, "heading" or like processes, as known in the art. The fastener 14 can be fabricated by known processes, such as, for example, forging a fastener blank, cold rolling the threads onto the blank and subsequently cutting or grinding the flutes 50 into the thread 26.

The Installation Tool

Figure 6:
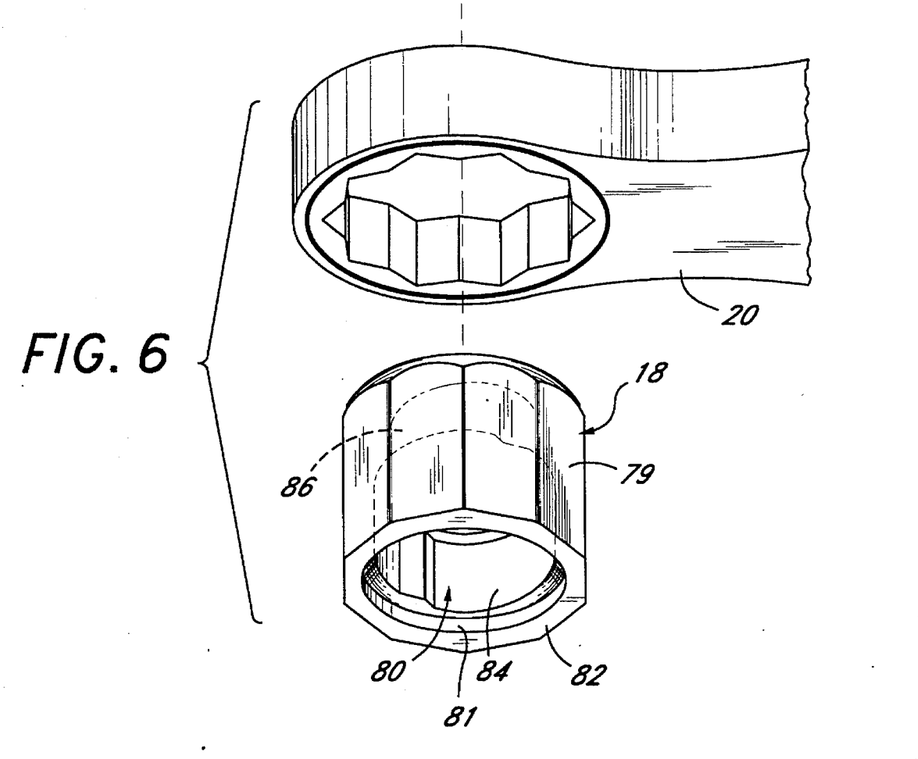
FIG. 6 is an exploded perspective view of an installation tool and wrench of FIG. 1.
Figure 6A:
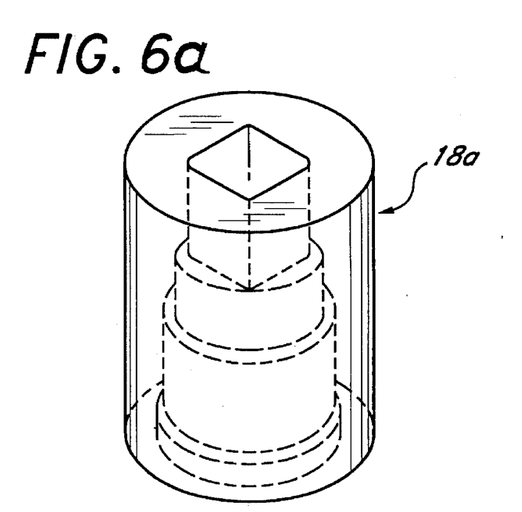
FIG. 6a is another embodiment of the installation tool of the present invention.

Referring to FIG. 6, the installation tool 18 has a polygonal-shaped exterior 79 which engages a correspondingly shaped cavity of the box wrench 20. Although FIG. 6 illustrates the installation tool 18 as an insert for a standard ratcheting box wrench 20, it is understood that an installation tool 18a can be formed as a standard socket for a socket driver wrench, as illustrated in FIG. 6a.

As illustrated in FIG. 6, the installation tool 18 defines a stepped axial bore 80 extending through the installation tool 18 in the longitudinal direction. The installation tool 18 defines a cylindrical counterbore 81 extending from a forward end 82 into the installation tool 18. The installation tool 18 additionally defines a large cavity 84 opening into a small cavity 86 in the rearward direction and opening into the counterbore 81 in the forward direction.

Figure 7:
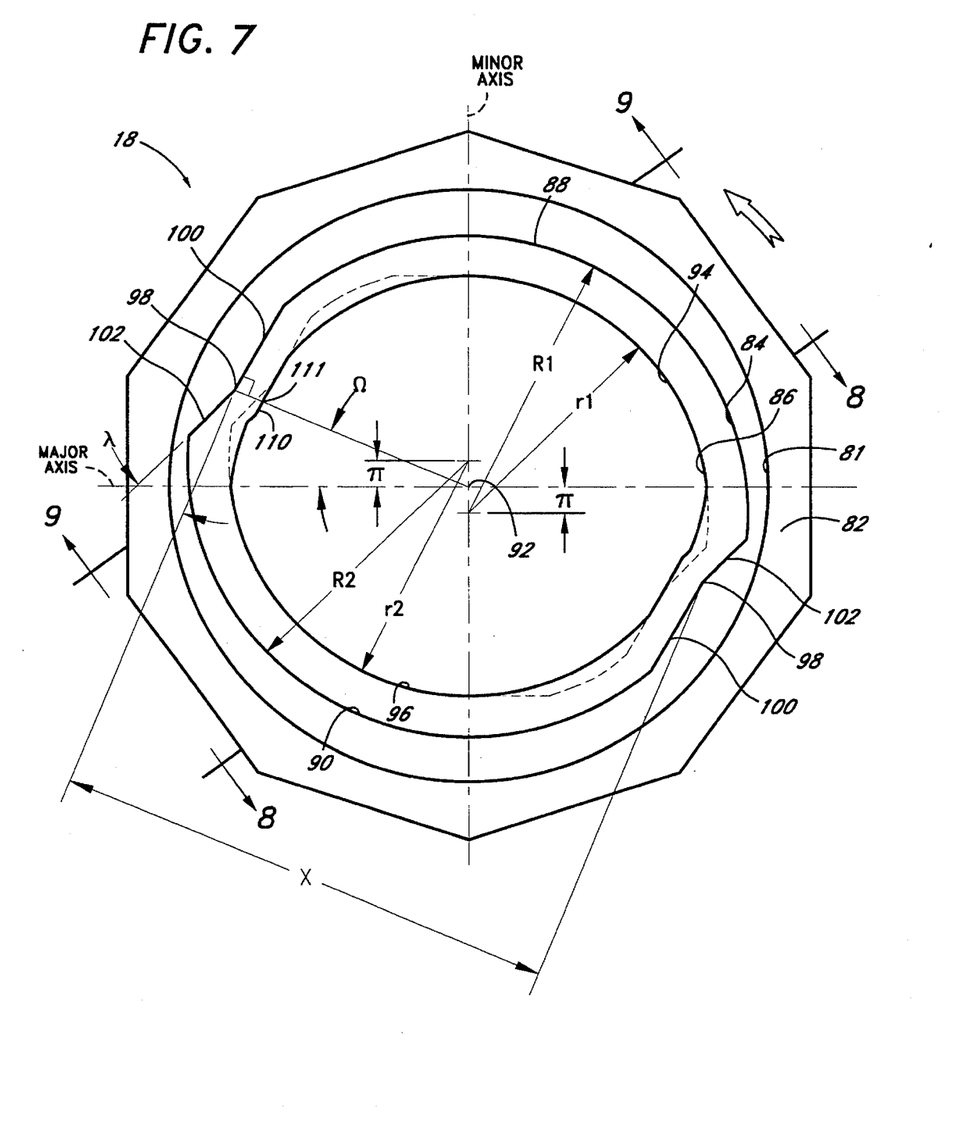
FIG. 7 is a bottom plan view of the installation tool of FIG. 6.

The large cavity 84 and the small cavity 86 are configured to engage the camming surfaces 76, 78 of the collar central portion 54 and the collar rearward portion 56, respectively. As illustrated in FIG. 7, the large cavity 84 has a shape complimentary to that of the central portion 54, and desirably has a generally elliptical shape in plan view. The small cavity 86 similarly has a generally elliptical shape complimentary to the shape of the collar rearward portion 56. The installation tool cavities 84, 86 are slightly larger than the corresponding collar portions 54, 56 to facilitate placement of the installation tool 18 over the collar 16. The minor diameter of the small cavity 86 desirably equals the minor diameter of the collar rearward portion 56 multiplied by the secant of 10°. For instance, the minor diameter of the small cavity 86 is about 0.006 inch larger than the minor diameter of the rearward portion 56 of a ¼"-28 UNF collar 16. The large cavity 84 advantageously is sufficiently larger than the collar central portion 54 such that the installation tool 18 is easily placed over the collar 16.

Desirably, the major axes of the large cavity 84 and the small cavity 86 are generally aligned. Likewise, the minor axes of the cavities 84, 86 are generally aligned.

Referring to FIG. 7, the large cavity 84 is defined between a first arcuate surface 88 and a second arcuate surface 90. The first surface 88 has a radius of curvature $R_1$ slightly larger than the radius of curvature $A_4$ of the collar central portion 54 (FIG. 5). Likewise, the second surface 90 has a radius of curvature $R_2$ slightly larger than the radius of curvature $A_3$ of the collar central portion 54. Each radius $R_1$, $R_2$ is offset from a center 92 of the installation tool 18 by a distance π, but on opposite sides of the center 92 along the minor axis of the large cavity 84.

Similarly, the small cavity 86 is defined between a first arcuate wrenching surface 94 and a second arcuate wrenching surface 96. The first wrenching surface 94 has a radius of curvature $r_1$ slightly larger than the radius of curvature $A_2$ of the collar rearward portion 56 (see FIG. 5). Likewise, the second wrenching surface 96 has a radius of curvature $r_2$ slightly larger than the radius of curvature $A_2$ of the collar rearward portion 56. Each radius $r_1$, $r_2$ is off-set from the installation tool center 92 by a distance π, but on opposite sides of the center 92 along the minor axis of the small cavity 86. In a preferred embodiment, the distance π approximately equals the collar distance δ (FIG. 5).

Figure 8:
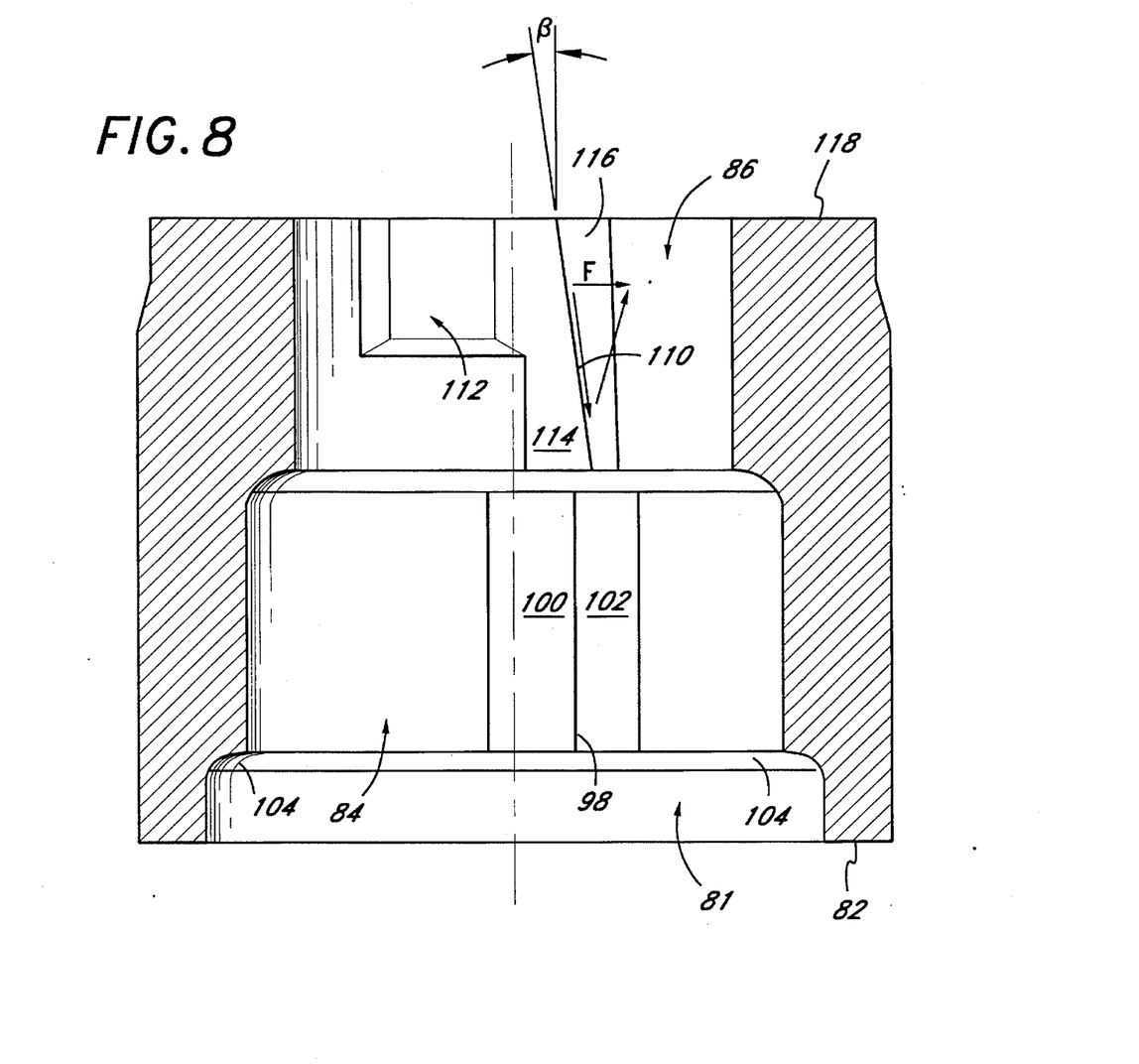
FIG. 8 is a cross-sectional view of the installation tool taken along line 8—8 of FIG. 7.

As best seen in FIG. 7, a pair of driving ridges 98 interrupt the generally elliptical shape of the large cavity 84. That is, the driving ridges 98 are disposed diametrically opposite each other on the arcuate surfaces 88, 90 of the large cavity 84. As illustrated in FIG. 8, each driving ridge 98 generally extends along the entire axial height of the large cavity 84 and is generally parallel to the longitudinal axis of the installation tool 18.

Referring to FIGS. 7 and 8, the intersection of a flat plane 100 and a relief plane 102 forms each driving ridge 98. Both planes 100, 102 extend in the longitudinal direction parallel to the longitudinal axis of the installation tool 18. As seen in FIG. 7, the flat plane 100 lies generally along a cord of the arc defined by the arcuate surface radius $R_1$, $R_2$, which is positioned perpendicularly to the radius $R_1$, $R_2$ at the driving ridge 98. The relief plane 102 truncates the flat plane 100 and angles outwardly from the flat plane 100 by an angle λ. The angle λ desirably equals about 15°. The line of intersection formed between the intersection of the flat plane 100 and the relief plane 102 defines the driving ridge 98 which contacts the collar central portion 54 during installation.

The point of intersection between the flat plane 100 and the relief plane 102 (i.e., the driving ridge 98) is off-set from the major axis of the large cavity 84 by an angle Ω which advantageously ranges between 15° and 30°, and desirably equals about 20°. The distance X between the driving ridges 98 is less than the major diameter of the collar central portion 54 and is greater than the minor diameter of the central portion 54. The distance X between the driving ridges 98 desirably equals a diametric distance across the collar central portion 54 at a point off-set from the central portion major axis by approximately 15° to 30°, and preferably at a point off-set by about 20°. That is, the distance X between the driving ridges 98 is generally equal to the distance between the camming surfaces 76 of the collar central portion 54 (see FIG. 5).

The driving ridges 98 advantageously engage the collar 16 proximate to the major axis of the collar central portion 54 to increase leverage. If angle Ω is too small, insufficient torque will be generated by the time the driving ridges 98 slip around the ends of the major axis of the collar 16 during the installation process. Conversely, if angle Ω is too large, too much torque will be generated which may over-stress the threads of the collar axial bore 58.

As best seen in FIG. 8, the installation tool 18 includes an arcuate transition section 104 disposed between the large cavity 84 and the counter bore 81, forming a curved transition between cavities 81, 84. The transition section 104 has a radius of curvature equal to one-half the difference between the diametric dimension of large cavity 84 and the diameter of the counterbore 81. During the installation process, the transition section 104 registers on the collar base shoulder 55, as discussed below.

Figure 9:
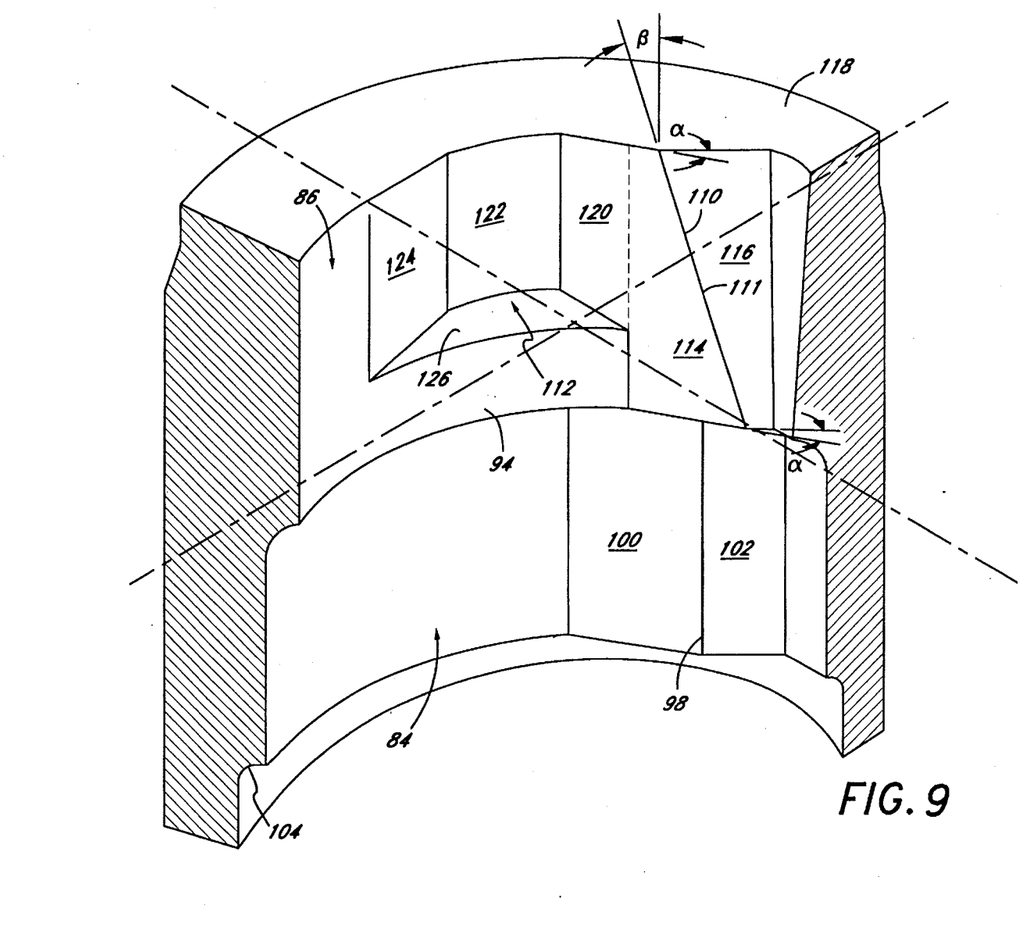
FIG. 9 is a perspective cross-sectional view of the installation tool taken along line 9—9 of FIG. 7.
Figure 10:
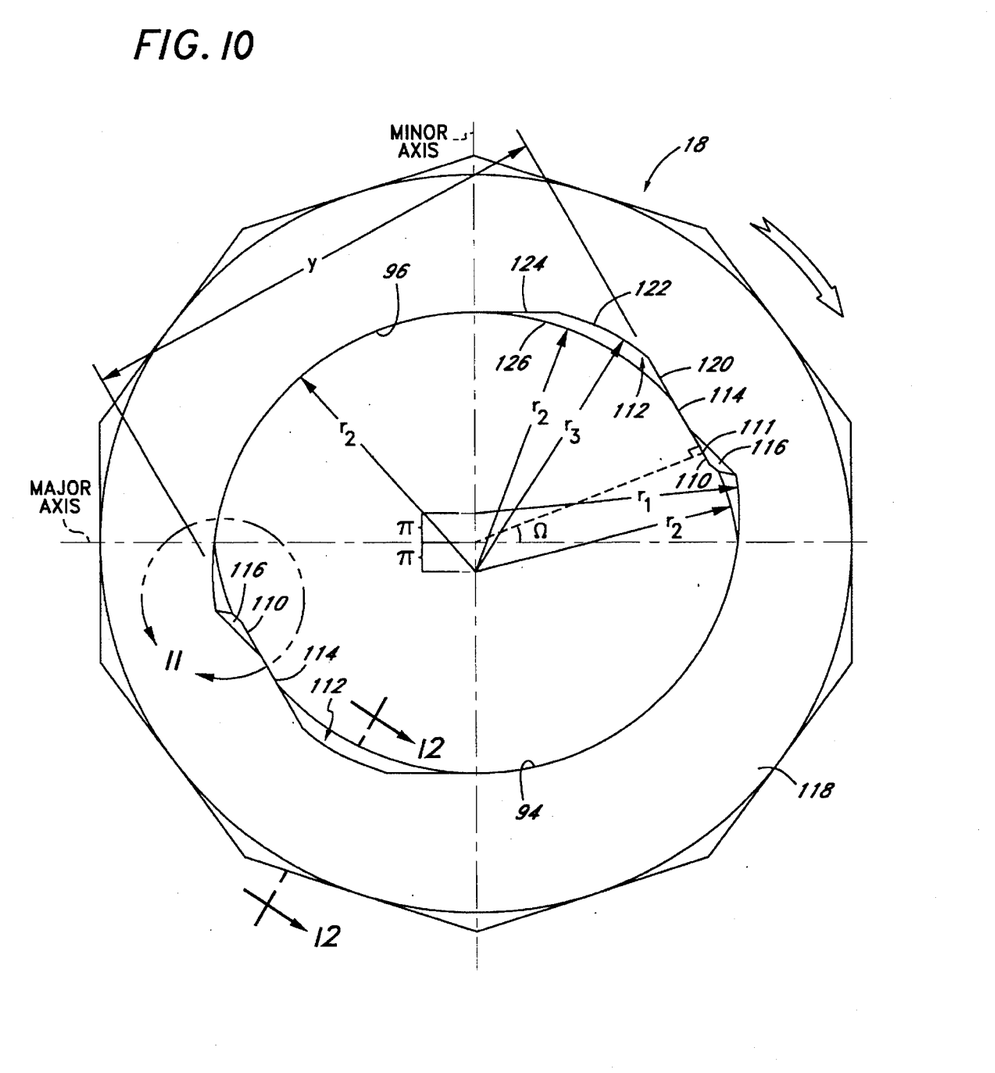
FIG. 10 is a top plan view of the installation tool of FIG. 6.

Referring to FIGS. 8, 9 and 10, the small cavity 86 includes a pair of oblique driving ridges 110 and a pair of exit vents 112. The oblique driving ridges 110 and the exit vents 112 hold the installation tool 18 on the collar 16 and prevent the installation tool 18 from prematurely camming-off of the collar 16 during installation, as is discussed in greater detail below.

The oblique driving ridges 110 are disposed diametrically opposite each other on the interior wall of the small cavity 86. As illustrated in FIG. 8, each oblique driving ridge 110 extends generally along the entire axial height of the small cavity 86 and is skewed in the longitudinal direction at an angled β from the longitudinal axis of the installation tool 18.

Referring to FIGS. 7 and 10, each oblique driving ridge 110 has a mid-point 111 bisecting the oblique driving ridge 110. As illustrated in FIG. 7, the mid-point 111 is located along a line extending between the driving ridge 98 of the large cavity 84 and the installation tool center 92. Thus, the mid-point 111 is off-set from the major axis of the small cavity 86 by the angle Ω.

As illustrated in FIG. 10, the distance Y between the mid-points 111 of the oblique driving ridges 110 is less that the major diameter of the collar rearward portion 56 and is greater that the minor diameter of the rearward portion 56. The distance Y between the oblique driving ridges 110 advantageously equals the diametric dimension across the collar rearward portion 56 at a point off-set from the major axis of the collar rearward portion 56 by approximately 15° to 30°, and desirably at a point off-set from the major axis of the rearward portion 36 by about 20°. That is, the distance Y between the oblique driving ridges 110 is generally equal to the distance between the camming surfaces 78 of the collar rearward portion 58 (see FIG. 5).

As best illustrated in FIG. 9, an intersection of a flat plane 114 and an oblique relief plane 116 forms each oblique driving ridge 110. The flat plane 114 lies generally parallel to the longitudinal axis of the installation tool 18 and, as best seen in FIG. 10, lies generally along a cord of the arc defined by the wrenching surface radius $R_3$, $R_4$, which is positioned perpendicularly to the radius $R_3$, $R_4$ at the mid-point 111 of the oblique driving ridge 110.

Figure 11:
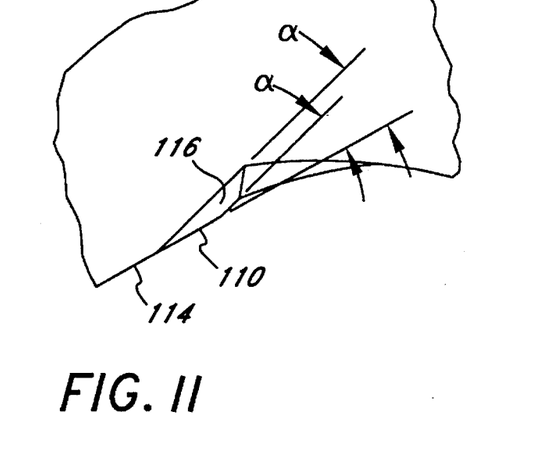
FIG. 11 is an enlarged partial top plan view of the area within line 11—11 of FIG. 10.

The oblique relief plane 116 truncates the flat plane 114 and angles outwardly from the flat plane 114 by an angle α (FIGS. 9 and 11) which equals about 10°, and desirably is 8°. In addition, as best illustrated in FIGS. 8 and 9, the oblique plane 116 is skewed with respect to the longitudinal axis of the installation tool 20 by the angle β and slopes negatively (i.e., slopes towards the large cavity 84 from left to right) for clockwise installation of the collar 16. Angle β is on the order of 20°, and desirably equals about 17°. The intersection between the flat plane 114 and the oblique relief plane 116 defines the oblique driving ridge 110 which contacts the collar rearward portion 56 during installation.

Referring to FIGS. 8 and 9, each exit vent 112 extends in the forward direction from a rearward end 118 of the collar 16 into the small cavity 86 for a sufficient distance such that when the installation tool 18 is placed over the collar 16, the portions of the collar rearward portion 56 juxtaposing the exit vents 112 have axial heights equal to about 0.75 P. The vent 112 also extends into the wrenching surfaces 94, 96 of the small cavity 86.

As best seen in FIG. 9, a leading flat 120, an arcuate back wall 122, a terminating flat 124 and a shoulder 126 define each vent 112. The terminating flat 124 extends from the minor axis of the small cavity 86 and, as best illustrated in FIG. 10, lies along a line tangent to the small cavity minor axis. The terminating flat 124 extends away from the minor axis and intersects with the back wall 122. The back wall 122 has a radius of curvature $r_3$ which is larger than the radius $r_2$ of the wrenching surface 96 by about 0.010 inch. The back wall 122 extends through an arc until it intersects with the leading flat 120. In a preferred embodiment, as best illustrated in FIG. 9, the leading flat 120 lies in the same plane as the flat plane 114 forming the oblique driving ridge 110.

Advantageously, the depth of the vents 112 are as small as possible for manufacturing considerations; specifically, the design should not produce a burr when honing the vents 112 by the manufacturing operation described below. However, the vents 112 should be significantly deep to receive enough collar material to hold the installation tool onto the collar during deformation of the rearward portion 56.

Figure 12:
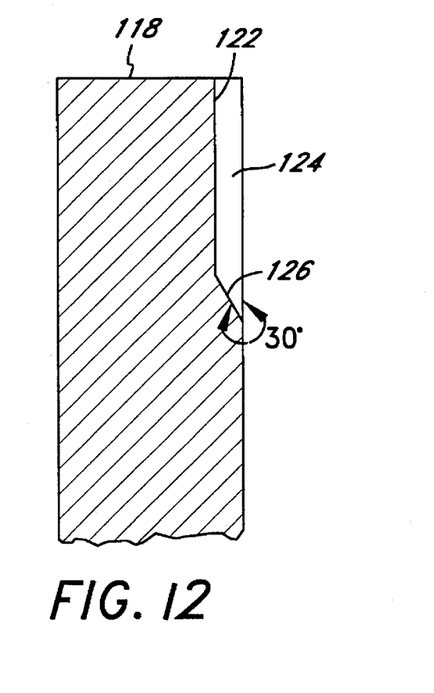
FIG. 12 is a partial cross-sectional view of the installation tool taken along line 12—12 of FIG. 10.

The leading flat 120, the back wall 122 and the terminating flat 124 preferably are generally parallel to the longitudinal axis of the installation tool 18 and extend between the shoulder 126 and the rearward end 118 of the installation tool 18. The shoulder 126 forms a transition between the arcuate wrenching surface 94, 96 of the small cavity 86 defined by the radius $r_1$, $r_2$ and the flats 120, 122 and back wall 122. As best seen in FIG. 12, the shoulder 126 is desirably angled from the longitudinal axis by about 30° to ease fabrication.

Referring to FIG. 10, the major axis and the minor axis of the small cavity 86 divide the small cavity 86 into four quadrants. The quadrants trailing the major axis as the installation tool 18 is rotated in the clockwise direction include the oblique driving ridges 110 and the exit vents 112. As a result, the collar locks together with the fastener 14 through a 180° rotation of the installation tool 18, as discussed in detail below.

The installation tool 18 is preferably made of hardened steel, carbide or another suitable high strength metal alloys. The installation tool 18 has a yield strength significantly greater than that of the collar material in order to deform the collar 16 at the specific preload while substantially maintaining the shape of the installation tool axial bore 80 during the installation process.

The installation tool 18 is formed from a round donut-shaped slug extruded into the configuration described above. Specifically, the slug is placed into a die comprising an extrusion bearing and a mandrel, with the donut-shaped slug fitting over the mandrel.

Desirably, the extrusion bearing has a polygonal shape conforming to a standard box wrench configuration. However, the extrusion bearing could have other configurations, such as, for example, an elliptical shape, for adapting the installation tool 18 to a pneumatically driven wrench.

The mandrel has an elliptical cross-sectional shape segment configured in accordance with the above description of the small cavity's 86 elliptical shape. The mandrel additionally includes a larger generally elliptical cross-sectional shape portion configured in accordance with the above description of the large cavity 84 and includes reliefs and flats which form the driving ridges 98. The mandrel also includes a cylindrical portion to form the counterbore 81. Under pressure, the slug conforms to the shape defined between the extrusion bearing and the mandrel.

A second mandrel, pushing from the rearward end of the slug, subsequently forces the first mandrel out of the formed small cavity 86. During this process, the second mandrel hones the small cavity 86, thereby forming the oblique driving ridges 110 and exit vents 112 into the interior wall of the small cavity 86 of the installation tool 18.

Although FIGS. 8 through 10 illustrate the oblique relief plane 116 extending along the entire axial height of small cavity 86, for manufacturing purposes the oblique relief plane 116 can extend from a rearward end 118 of the installation tool 18 to a point proximate to the transition between the large cavity 84 and the small cavity 86, but not into the large cavity 84. This configuration of the installation tool 18 prevents the formation of a burr at the transition between the cavities 84, 86.

As an alternative to forming the driving ridges 98, 110 as described above, it is also contemplated that the driving ridges 98, 110 can be formed by drilling holes into the slug, the hole, in part, break through the walls of the cavities 84, 86. Thereafter, pins are press fit into the holes such that a portion of the pins peripheries exterior extend into the cavities 84, 86 to form the driving ridges 98,110 at the positions described above.

Method of Installing the Fastener System

Figure 13:
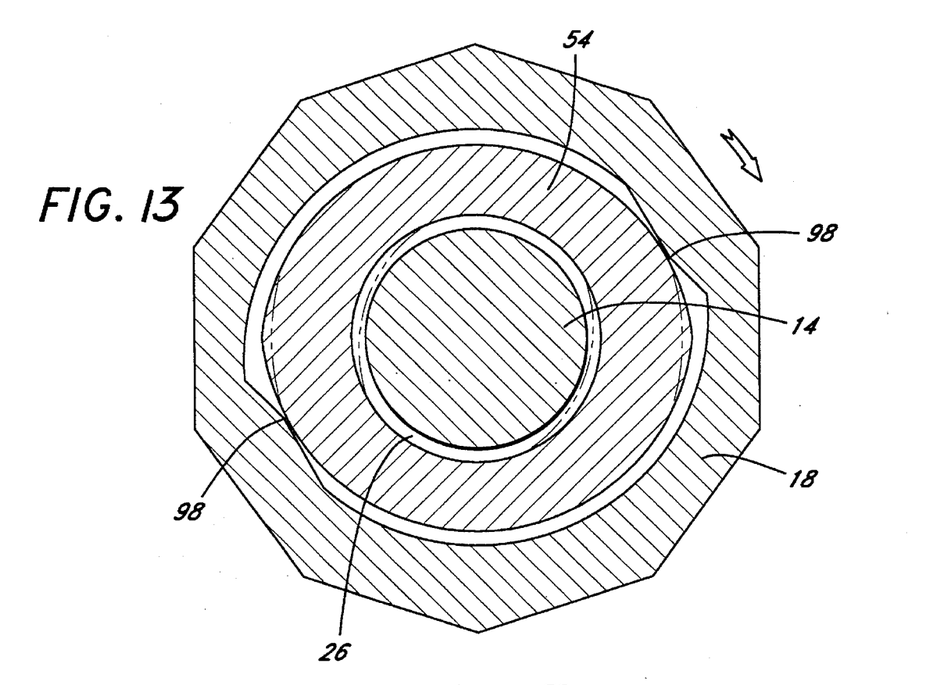
FIG. 13 is a cross-sectional view of the fastener system and installation tool taken along line 13—13 of FIG. 1, illustrating in phantom line the configuration of the collar central portion after plastic deformation.

Installation of the fastener system 10 will now be described with reference to FIGS. 1, 13 and 14. As illustrated in FIG. 1, the threaded fastener 14 is inserted through the work pieces 12 which are being fastened together, and the collar 16 is placed on the threaded portion 26 of the fastener 14. With the installation tool 18 press-fit into the wrench 20, the installation tool 18 is slid over and onto the duplex collar 16. The installation tool transition section 104 abuts against the collar base shoulder 57, registering the installation tool 18 with the duplex collar 16 for axial positioning.

The small cavity 86 only contacts the upper 80% of the collar rearward portion 56 when registered. In other words, a forward segment of the rearward portion 56 having an axial height of about 0.75 P remains unworked during the installation process described below. If the forward segment of the rearward portion 56 is worked, the torque required to swage the collar material during the locking process is equal to or greater than the preload torque, because the forward segment of the rearward portion 56 resists deformation during swaging. However, by working only the segment of the rearward portion 56 distal of the collar central portion 54, the torque required to swage the rearward portion 56 can be designed to be less than the torque required to produce preload but greater than the torque carried by the rearward portion 56 up until preload.

The wrenching key 33 extends through the installation tool 18 along the longitudinal axis of the fastener 14. The wrenching key 33 closely fits inside the fastener cavity 32, holding the fastener 14 stationary while the collar 16 is tightened onto the fastener 14. As a result, the collar 16 can be installed from one side of the joined materials 12 (i.e., from the blind side).

Rotation of the installation tool 18 brings the driving ridges 98, 110 of the large and small cavities 84, 86 into contact with the collar central portion 54 and the collar rearward portion 56, respectively. Further rotation of the installation tool 18 applies a torque to the rearward portion 56 and to the central portion 54 along the driving ridges 98, 110 contacting the collar 16, which threads the collar 16 onto the threaded fastener 14.

Initially, the resistance to rotation is minimal and the installation tool 18 and collar 16 rotate at the same rate. At this stage of the installation process, the central portion 54 has a generally undeformed, elliptical cross-sectional shape, as shown in FIG. 13, and the rearward portion 56 also has a generally undeformed, elliptical cross-sectional shape, as illustrated in FIG. 14. Because the shapes of the central portion 54 and rearward portion 56 are unmodified, the driving ridges 98,110 of the large and small cavities 84, 86 continue engaging the central and rearward portions 54, 56, respectively, and applying a torque to the duplex collar 16.

The resistance to threading eventually increases as the collar 16 is tightened onto the threaded fastener 14. When the applied torque approaches the preload torque, the driving ridges 98, 110 begin digging into the central portion 54 and the rearward portion 56, respectively. Because the installation tool 18 digs into the collar 16, as opposed to pushing on the collar 16, the installation tool 18 generates higher preloads than those produced by prior installation tools contacting a collar with flats or arcuate surfaces.

The pure rotational force (i.e., the torque) exerted by the installation tool 18 along each oblique driving ridge 110 is split into rectangular force components that act perpendicular and parallel to the lay of the oblique driving ridge 110, as schematically illustrated in FIG. 8. The force component acting in the direction of the oblique driving ridge 110, exerts an axial thrust on the installation tool 18, urging the installation tool 18 onto the collar 16 to counteract the natural reactionary tendency to cam-off.

Advantageously, at this stage the installation tool 18 only slightly compresses the duplex collar 16 into the threads 26 of the fastener 14 because the installation tool 18 contacts the collar only at its driving ridges 98, 110, minimizing the radial compressive force it exerts on the collar 16. Importantly, the driving ridges 98, 110 of the installation tool 18 have sufficient axial lengths, spreading the applied torque over a large enough collar area such that the collar 16 withstands deformation up until the torque required to produce the desired preload.

Additionally, the present flute design of the fastener 14 does not exacerbate the effect of elastically compressed collar material because the flute design prevents premature captivation of the collar 16. Collar material compressed into the flutes 50 travels over the convex surface 36 of the fastener thread recesses 34 as the collar 16 continues to rotate. Blending the bottom of the recesses 34 in the direction in which the collar 16 turns delays fastener 14 capture by the rotating collar 16, thereby allowing a high preload to develop on the joint 12 without over-stressing the hexagon key 33.

When the applied torque approximately equals the torque required to produce preload, the driving ridges 98. 110 begin plastically deforming the collar central and rearward portion 54, 56, pushing the collar material around their respective major axes. At the point of producing the desired preload, the driving ridges 98, 110 have wiped the material of the collar camming surface 76, 78 around the circumference of the central portion 54 and the rearward portion 56 proximate to the major axes of the collar 16. FIG. 13 illustrates the deformed configuration of the collar central portion 54 in phantom line.

Although the large cavity driving ridges 98 force some percentage of the deformed collar material of the central portion 54 into the fastener threads 26, this radial plastic deformation does not lock together the collar 16 and the fastener 14. The collar material fills the voids defined between the series of thread crests 27, but the deformed material does not fill any of the fastener flutes 50.

At this stage, the driving ridges 98 of the large cavity have slipped around the ends of the major axis, completed their function and rotated out of engagement with the central portion 54. Consequently, the collar rearward portion 56 carries all subsequently applied torque. Additionally, the oblique driving ridges 110 of the small cavity 86 have slipped around the ends of the major axis, rotated out of engagement with the rearward portion 56, and completed their function. The collar 16 will no longer turn.

The arcuate wrenching surfaces 94, 96 trailing the oblique driving ridges 110 rotates into engagement with the collar rearward portion 56 as the installation tool 18 continues its rotation. The arcuate wrenching surfaces 94, 96 plastically deform the rearward portion 56 in the radial direction towards the fastener 14 and into the fastener flutes 50 because the distance between the arcuate wrenching surfaces 94, 96 and the installation tool center 92 decreases as the installation tool 18 is rotated to sweep its minor diameter past the major axis of the collar rearward portion 56.

The installation tool 18, however, does not contact the collar rearward portion 56 at the exit vents 112. Thus, the exit vents 112 are non-working reliefs in the arcuate wrenching surfaces 94, 96 of the small cavity 86 which allow collar material to bypass deformation. The arcuate wrenching surface 94, 96 below the exit vent 112, however, deform the rearward portion 56 radially inward as previously described. The effect is to delay the swaging at the exit vents 112, thus trapping the installation tool 18 onto the collar 16. The installation tool 18 cannot cam-off at this stage because the undeformed rearward portion 56 within the exit vents 112 prevents the exit vent shoulder 126 from moving axially in the rearward direction.

Continued rotation of the installation tool 18 brings the terminating flats 124 of the exit vents 112 into contact with the undeformed collar material within the exit vents 112. The terminating flats 124, which coincides with and are perpendicular to the minor axis of the smaller cavity 86, swage the undeformed material from the collar rearward portion 56 into the fastener flutes 50.

Figure 14:
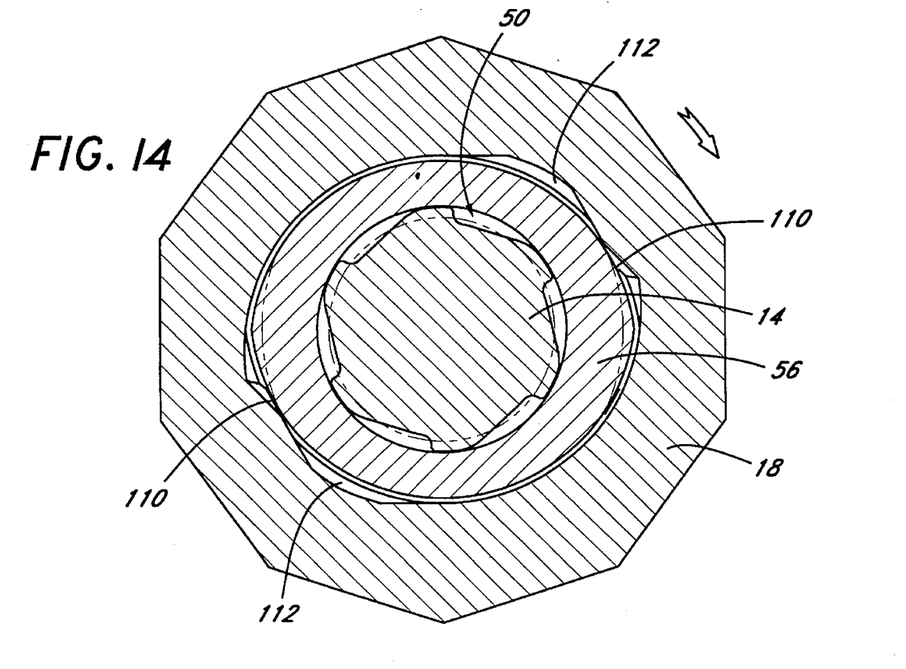
FIG. 14 is a cross-sectional view of the fastener system and installation tool taken along line 14—14 of FIG. 1, illustrating in phantom line the configuration of the collar rearward portion after plastic deformation.

Referring to FIG. 14, the rearward portion 56 of the collar 16 is deformed radially inwardly from its elliptical, out-of-round shape to a generally circular shape (shown in phantom line) which prevents the application of further torque. Although some collar material is displaced circumferentially, from the major axis towards the minor axis, the fastener flutes 50 should have sufficient void volume to receive a majority of the radially deformed collar material.

The smooth surfaces of the arcuate wrenching surfaces 94, 96 and the terminating flats 124 finish swaging the collar rearward portion 56 as they slip around the major axis of the collar 16. At this stage, the collar 16 is completely swaged onto the fastener and the installation tool 18 rotates to a non-working position (which enables disengagement), 180° from where the installation tool began rotating about the collar 16. Consequently, the installation tool 18 can be used in more confined areas than prior installation tool which require 360° of tool rotation to complete the swaging operation.

Once the collar rearward portion 56 completely deforms, the installation tool 18 freely cams off of the duplex collar 16. The significant looseness provided by the overall diameter of the cavities 84, 86 compared with the restrictive distance between the driving ridges 98, 110 allows for ready removal of the installation tool 18 at the end of installation.

The present invention advantageously separates the generation of the preload from the formation of the lock, by using the central portion 54 to generate a majority of the preload and the rearward portion 56 to form the lock. This feature is taught by U.S. patent application Ser. No. 07/481, 373, now issued as U.S. Pat. No. 5,145,300, which is hereby incorporated by reference. The subject matter of the present application and of patent application Ser. No. 07/481,373 were, at the time the inventions were made, subject to an obligation of assignment to the same person.

Moreover, the designs of the duplex collar 16, the fastener flute 50 and the installation tool 18 significantly reduce precapture and elastic radial compression experienced with prior locking fastener systems. Thus, the present fastener system 10 enhances the repeatability and predictability of preload values produced at the junction of the joined materials 12.

Modifications and variations of the embodiments described above may be made by those skilled in the art while remaining within the true scope and spirit of this invention. For instance, oblique driving ridges may be disposed in the large cavity of the installation tool. In addition, although the tool has been solely described as being formed from a single piece of material, the tool could consist of at least two separate rings press-fit into the tool in the desired orientation. Finally, it is understood that while the installation tool of the present invention is shown and described for clockwise rotation, the driving ridges could be disposed for counter-clockwise rotation of the installation tool. Accordingly, the scope of the invention is intended to be defined only by the claims which follow.

What is claimed is:

1. A fastener for use with a deformable collar to join together materials under a compressive load, said fastener and deformable collar reaching a desired preload before said collar substantially deforms, said fastener comprising:

a head; and a shank having a threaded portion, said threaded portion comprising a standard thread forming a helical series of crests and roots with a plurality of recesses interrupting said thread, each recess comprising a shoulder, a bottom surface extending from said shoulder, and a convex trailing end which extends from said bottom surface and smoothly chases and blends into said thread crest, whereby deformed material from said collar is prevented from capturing said fastener before said fastener and collar reach the desired preload.

2. The fastener of claim 1, wherein said shoulder extends generally in the radial direction between said thread crest and a point on said thread proximate to said thread root.

3. The fastener of claim 1, wherein a plurality of said recesses are generally aligned to form a flute.

4. The fastener of claim 3, wherein said fastener thread defines at least four flutes.

5. The fastener of claim 3, wherein said flute is generally parallel to a longitudinal axis of said fastener.

6. The fastener of claim 1, wherein each recess has a depth, measured in the radial direction from said thread crest, less than the depth of said thread root.

7. The fastener of claim 1, wherein said shoulder includes a chamfer positioned proximate of said thread crest.

* * * * *